(No Model.)  C. H. KEENEY.  3 Sheets—Sheet 1.
SYSTEM AND DEVICE FOR ELEVATING WATER BY PNEUMATIC PRESSURE.
No. 491,116.  Patented Feb. 7, 1893.

Witnesses.
Jos. F. Kizek
Anna V. Faust

Inventor.
Charles H. Keeney
By Benedict & Morsell
Attorneys.

(No Model.) 3 Sheets—Sheet 2.

C. H. KEENEY.
SYSTEM AND DEVICE FOR ELEVATING WATER BY PNEUMATIC PRESSURE.

No. 491,116. Patented Feb. 7, 1893.

Witnesses.
Fred S. Hunt
Anna V. Faust

Inventor.
Charles H. Keeney
By C. T. Benedict
Attorney.

(No Model.) 3 Sheets—Sheet 3.
C. H. KEENEY.
SYSTEM AND DEVICE FOR ELEVATING WATER BY PNEUMATIC PRESSURE.
No. 491,116. Patented Feb. 7, 1893.

Witnesses.
Fred S. Hunt
Anna V. Faust

Inventor.
Charles H. Keeney
By C. T. Benedict
Attorney.

UNITED STATES PATENT OFFICE.

CHARLES H. KEENEY, OF MILWAUKEE, WISCONSIN.

SYSTEM AND DEVICE FOR ELEVATING WATER BY PNEUMATIC PRESSURE.

SPECIFICATION forming part of Letters Patent No. 491,116, dated February 7, 1893.

Application filed June 6, 1891. Serial No. 395,368. (No model.)

*To all whom it may concern:*

Be it known that I, CHARLES H. KEENEY, of Milwaukee, in the county of Milwaukee and State of Wisconsin, have invented new and useful Improvements in the System and Devices for Elevating Water by Pneumatic Pressure, of which the following is a description, reference being had to the accompanying drawings, which are a part of this specification.

My invention relates to devices for utilizing compressed air, water or gases, for raising and forcing water through service pipes in buildings or wherever the water raised is to be used, in such manner and under such constant pressure that the water may be drawn from the pipes to an amount desired at such times as required.

The invention consists in the novel construction and arrangement of the devices hereinafter described and claimed.

Figure 1:
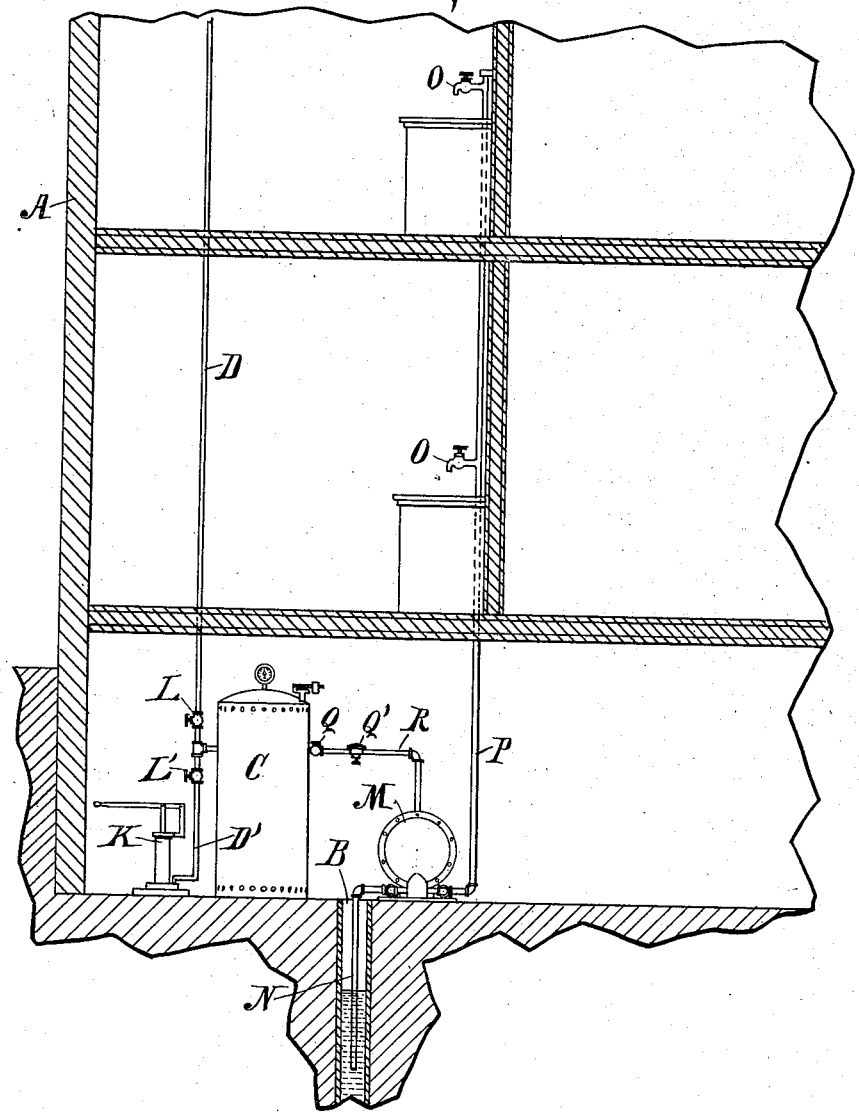
Figure 2:
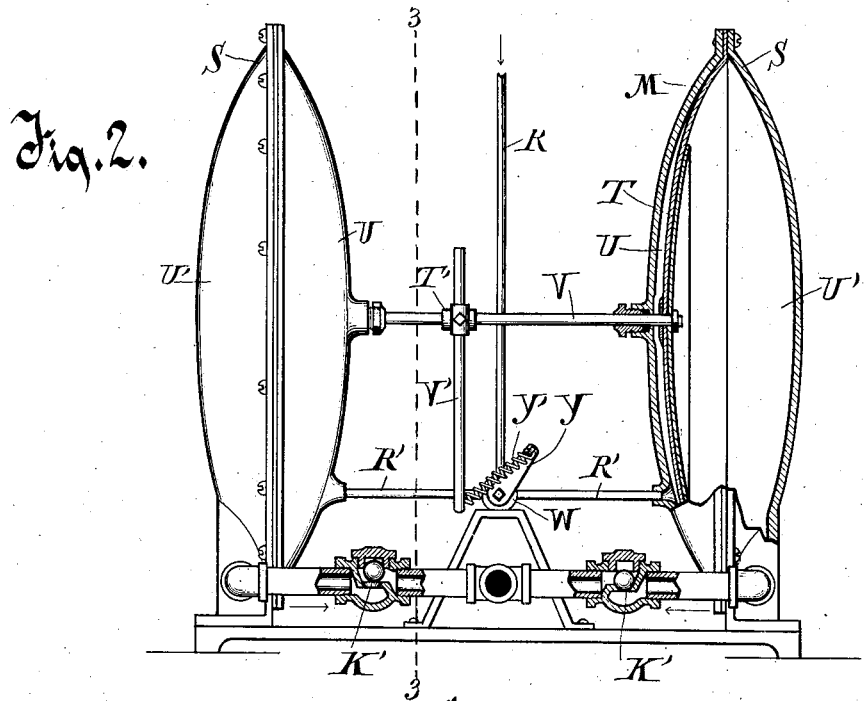
Figure 3:
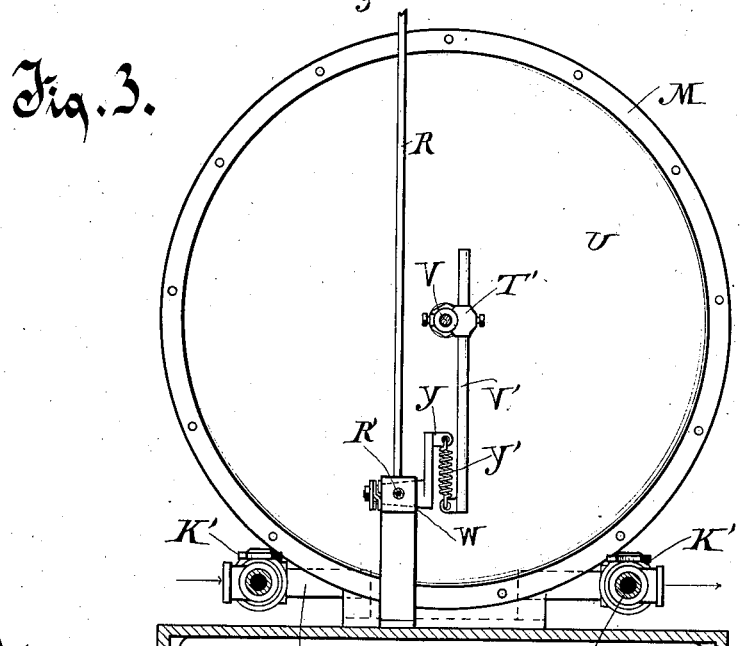
Figure 4:
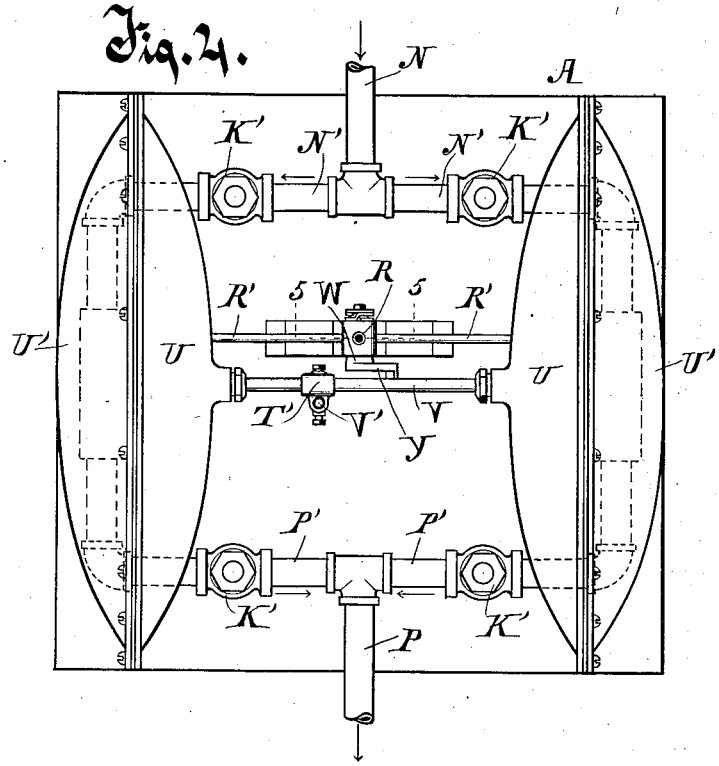
Figure 5:
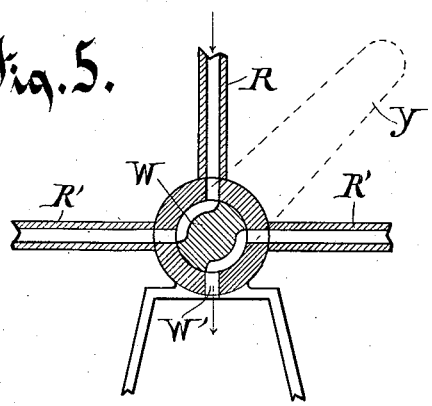

In the drawings, Figure 1, is a vertical section of a portion of a two story building with cellar and well and my improved devices shown in connection therewith. Fig. 2, is a side elevation, parts being broken away and other parts being in section, of the principal mechanism for utilizing the compressed air and elevating the water. Fig. 3, is a vertical section of the same mechanism shown in Fig. 2, taken on line 3—3 thereof looking toward the right. Fig. 4, is a top plan view of the mechanism shown in Fig. 2. Fig. 5, is a detail in section on line 5—5 of Fig. 4.

A is a two story building with cellar, and a well B, for convenience shown as being in the cellar of the building.

A reservoir C adapted for holding compressed air is for convenience located in the cellar of the building. A hand pump K connected to the reservoir by a pipe D', or a windmill or steam engine or other means may be used to supply the reservoir with the requisite compressed air, water or gases. It may be supplied through a pipe D. The pipes D and D' are provided with stop cocks L and L' respectively for closing them when desired.

The device M for utilizing the compressed air and raising the water from the well and forcing it through the service pipes is located at any convenient place, advisedly near the well but not in the water. An induction pipe N leads from the water in the well to the device M, and a water eduction or service pipe P leads therefrom through the building and is provided with faucets O at desired localities. An air pipe R leads from the reservoir C to the device M, which pipe is advisedly provided with a stop cock Q and a pressure regulator Q'.

In the operative device M there are two receptacles or chambers S having convex or suitably curved sides and interposed flexible diaphragms T secured at their edges to the walls of the receptacles or chambers, conveniently by being placed between the walls and secured thereto by the bolting together of the two parts of the walls of the chambers. These diaphragms divide the chambers respectively into an air compartment U and a water compartment U'. The receptacles or chambers S are located at a little distance from but opposite to each other and the diaphragms T of the two receptacles are connected to each other centrally rigidly by the rod V passing movably through air tight stuffing boxes therefor in the walls of the receptacles S. The air pipe R leads, through its branches R', into the air compartments U.

A fourway plug valve W is arranged in the pipe R at the point where it branches into the pipes R', which plug valve is arranged to open the pipe R into one or the other of the pipes R', and at the same time to open the pipe R' not so connected with the pipe R, to the outer air through the port W'. The plug valve W is provided with a crank arm Y the outer end of which is connected preferably by a coiled wire spring Y' to an arm V' secured adjustably to the rod V conveniently by an integral block or sleeve T'' having apertures through which the rods V and V' respectively pass and to which they are adjustably secured by set screws turning in the sleeve against them. The arm V' is moved laterally by the shifting of the rod V with the diaphragms, the arm being arranged to pass the axis of the valve W on the side opposite to the crank arm Y and the connection of the arm V' with the crank arm Y is such as to carry the connecting spring Y' from one side to the other of the axis of the plug valve W at about the moment that the diaphragms T reach the limit of their vibration, whereby the plug valve is at that moment shifted by contraction of the spring and the passage from the pipe R is changed from one of the branches R' to the other branch R', and the branch R' theretofore open to pipe R is opened to the port W'. By this means the reservoir C is automatically put in communication with the compartments U alternately and the diaphragms are vibrated under the force of the compressed air let alternately into the compartments U.

The water induction pipe N leads through the branches N' N' into the compartments U', and the pipe P leads by its branches P' P' from the compartments U'. Each of the branches N' and P' is provided with a check valve K' adapted to prevent the backward flow of water therethrough.

It will be understood that the air pump is adapted to fill the reservoir C with compressed air and that the compressed air from the reservoir C being admitted through the pipe R to the device M vibrates the diaphragms T whereby water is by suction drawn up from the well into the compartments U' alternately, from which by the same action of the diaphragms it is forced upwardly into the service pipe P, from which it may be drawn from time to time as desired through the faucets O.

By adjustment of the arm V' vertically in the block T' or by the adjustment of the block T' laterally on the rod V or both, the shifting of the valve W can be regulated and adjusted to the possible or desired movement of the diaphragms.

What I claim as my invention and desire to secure by Letters Patent is:

1. A device for elevating water, comprising two receptacles located opposite each other, flexible diaphragms therein dividing each receptacle into two compartments, a rod connecting the diaphragms and compelling the equal and concurrent movement thereof, induction and eduction water pipes leading to and from one compartment in each receptacle, said pipes being provided with check valves, induction and exhaust pipes leading to and from the other or air compartments of the receptacles, a four-way valve in the latter pipes arranged to open and close the pipes to a compartment and to the exhaust alternately, a crank arm on the valve, a valve-actuating arm secured to and carried by the diaphragm-connecting rod, and projecting therefrom in such manner as to be carried thereby past the axis of the valve on the side thereof opposite to its crank arm, and a spring connecting the arm to the crank arm on the valve, substantially as described.

2. A device for elevating water, comprising two receptacles located opposite each other, flexible diaphragms therein dividing each receptacle into two compartments, a rod connecting the diaphragms and compelling the equal and concurrent movement thereof, induction and eduction water pipes leading to and from one compartment in each receptacle, said pipes being provided with check valves, induction and exhaust pipes leading to and from the other or air compartments of the receptacles, a four-way valve in the latter pipes arranged to open and close the pipes to a compartment and to the exhaust alternately, a crank arm on the valve, a valve-actuating arm secured to and carried by the diaphragm-connecting rod, and projecting therefrom in such manner as to be carried thereby past the axis of the valve on the side thereof opposite to its crank arm, a block T adjustable on the diaphragm-connecting rod in which the valve-actuating arm is adjustable transversely to the diaphragm-connecting rod and a spring connecting the end of the arm to the crank arm on the valve, substantially as described.

In testimony whereof I affix my signature in presence of two witnesses.

CHARLES H. KEENEY.

Witnesses:
JOE J. KUHN,
ANNA V. FAUST.